July 22, 1930.   C. SAUZEDDE   1,771,010

WHEEL BRAKE MECHANISM

Filed June 14, 1926   2 Sheets-Sheet 1

Inventor
Claude Sauzedde
By
Attorneys

Inventor
Claude Sauzedde,
By
Attorneys

Patented July 22, 1930

1,771,010

UNITED STATES PATENT OFFICE

CLAUDE SAUZEDDE, OF DETROIT, MICHIGAN

WHEEL BRAKE MECHANISM

Application filed June 14, 1926. Serial No. 115,779.

This invention relates to a brake mechanism for vehicle wheels, although it is capable of general use where a rotating cylindrical body is to be retarded or stopped. The invention has special reference to that type of mechanism wherein two or more brake shoes are arranged within a drum or other rotary member and adapted to frictionally engage the drum to retard or eventually stop rotation thereof. In this type of brake mechanism it is essential that the brake shoes be evenly actuated to avoid unnecessary wear, vibration and disruption of the mechanism. It is also necessary that some provision be made to compensate for wear on drum and shoe linings, and it is in these connections that I have devised certain improvements.

First, there is a novel shoe adjusting mechanism for applying the brake shoes for braking purposes, the adjusting mechanism including a leverage arrangement by which minimum movement of an actuator is translated to the brake shoes for a maximum and positive movement of the same relative to the brake drum.

Second, a novel pivotal mounting is employed for the brake shoes so that a maximum surface of the shoes will be brought into action when applied to the brake drum. The pivotal mounting affords a floating arrangement of the brake shoes and permits of uniform pressure of the shoes—from end to end—when applied to the brake drum.

Third, a shoe adjusting device is employed to compensate for wear, said adjusting device permitting of adjustments being made from time to time to take up any lost motion or other inequalities incurred by service.

Fourth, the manner of supporting the brake shoes permits of self centralization and self energizing as applied to a brake drum, so that there may be a positive braking action.

The above and other structural improvements will more fully appear as the invention is described by the aid of the drawings, wherein Figure 1 is a longitudinal sectional view of a vehicle wheel having a brake mechanism in accordance with this invention;

Figure 2:
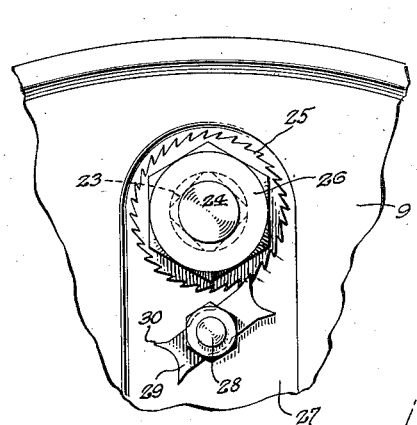
Fig. 2 is a side elevation of a portion of the brake mechanism showing the shoe adjusting device.
Figure 1:
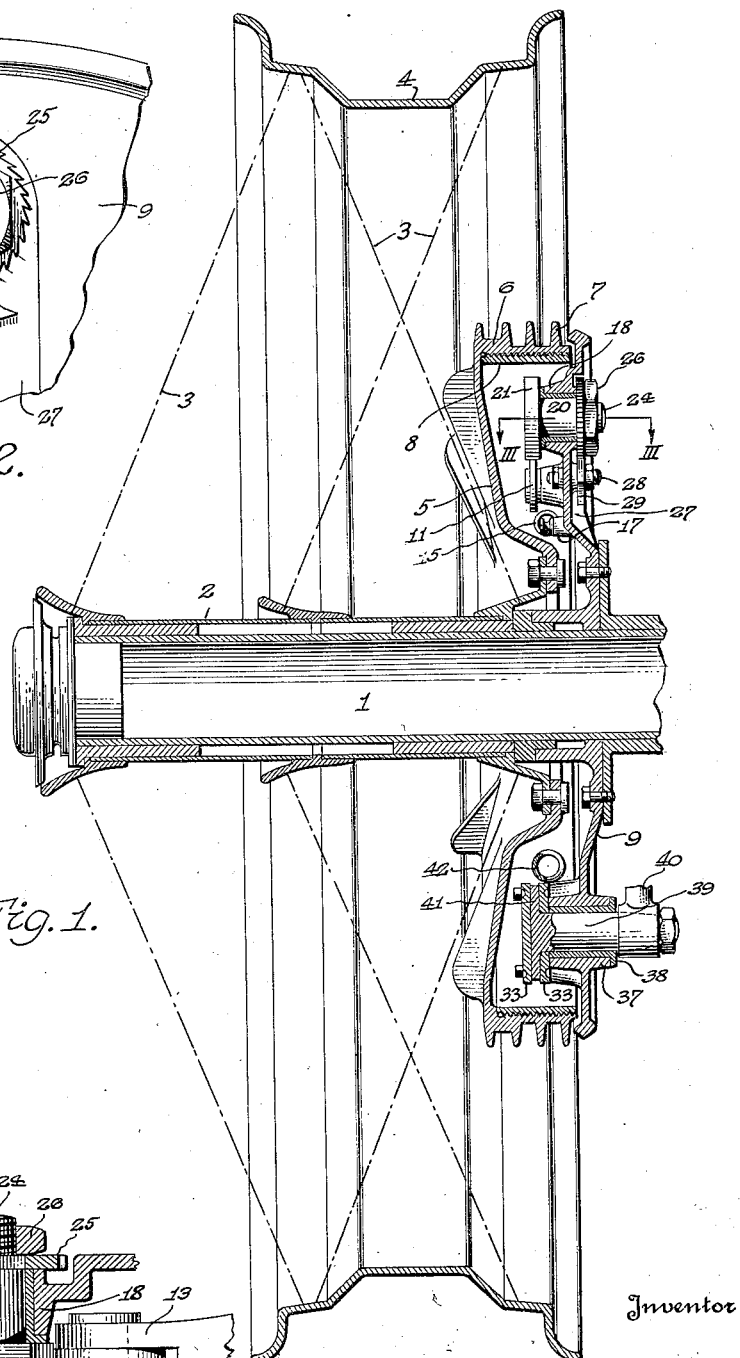

In order that my invention may be identified with a vehicle wheel, I have shown the end of an axle 1 having a rotatable wheel hub 2 provided with spokes 3 supporting a tire rim 4.

Suitably supported from the inner end of the wheel hub 2 is the ribbed wall 5 of a brake drum 6 which also has its periphery provided with ribs 7. All of these ribs are for heat radiating purposes and when the drum 6 is made of aluminum, it may be provided with a liner 8 of some indurate metal, for instance steel. The liner 8 may be screwed or otherwise mounted in the drum to become firmly anchored and form a part of said drum.

Figure 3:
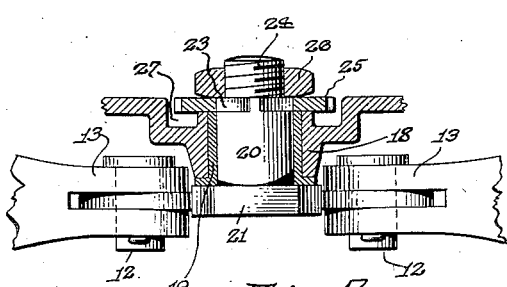
Fig. 3 is a horizontal sectional view taken on the line III—III of Fig. 1.

Stationary on the axle 1 is a closure plate 9 for the open side of the drum 6, said closure plate having its peripheral edges extending over the edges of the drum 6 so as to exclude dirt and foreign matter from the interior of the drum. The closure plate constitutes a support, somewhat similar to a spider, for my brake mechanism, and reference will first be had to Figs. 3 and 4.

On the closure plate 9 are inwardly projecting spaced apart studs 10 and on these studs are the inner slotted ends 11' of floating pivotal members 11 which are in opposed relation and have the outer ends thereof pivotally connected, as at 12, to the bifurcated ends 13 of opposed brake shoes 14, said shoes being arcuate and provided with linings 15 adapted to engage the lining 8 of the drum 6. The ends 13 of the brake shoes 14 are held in a retracted position by coiled springs 15$^a$ connected to apertured ears 16 of the brake shoes and to an anchoring stud 17, carried by the closure plate 9.

The closure plate 9 is formed with a bearing 18 containing a bushing 19 for the stud 20 of a cam 21 arranged between cam engaging faces 22 of the pivotal members 11. By rotating or rocking the stud 20 the cam 21 can be set to form an abutment for holding the ends 13 of the shoes 14 a desired distance apart, and it is through the medium of this adjustable cam that the normally floating ends of the brake shoes may be adjusted from time to time to compensate for wear.

The cam stud 20 has facets 23 and a screw-threaded stem 24. On the facets 23 is mounted a toothed or ratchet wheel 25 retained thereon by a nut 26 screwed on the stem 24. The form of the bearing 18 provides a recess 27 as a housing for the ratchet wheel 25 and in this recess is a nut equipped stud 28 for a multi-toothed pawl or detent 29 which set with one of its teeth in engagement with the ratchet wheel 25. By reference to Fig. 2, it will be noted that the teeth 30 of the pawl 29 differ to the extent of permitting the pawl being set, relative to the ratchet wheel 25, to hold said wheel at a desired adjustment. A single toothed pawl would possibly allow some lost motion in the ratchet wheel 25, because the teeth of said ratchet wheel are alike, but with different pawl teeth it is possible to position the pawl whereby it will positively hold the ratchet wheel 25 to the position to which it is rotated.

Figure 4:
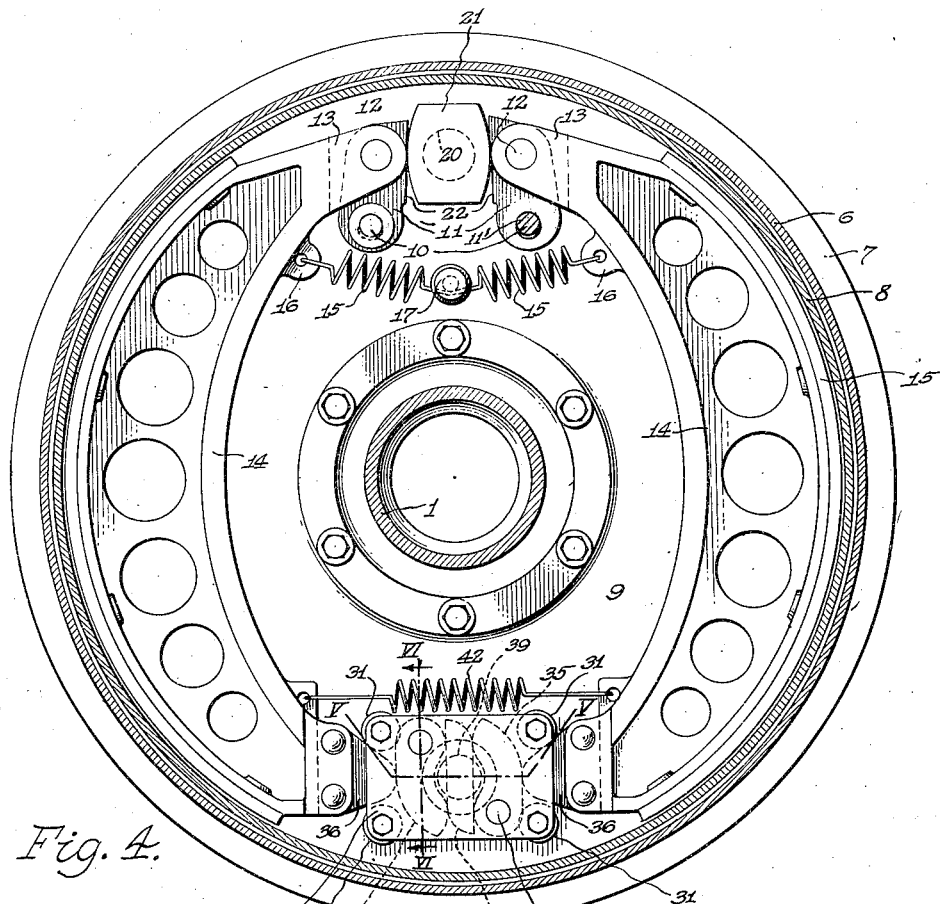
Fig. 4 is an enlarged side elevation of the brake mechanism in connection with a drum which is shown in section.
Figure 5:
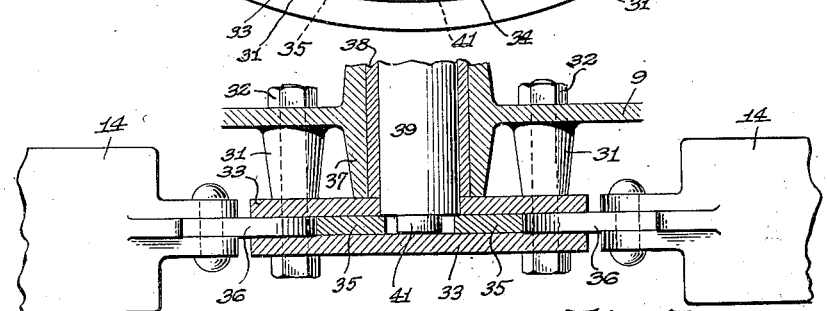
Fig. 5 is an enlarged horizontal sectional view taken on the line V—V of Fig. 4, showing the shoe actuator.
Figure 6:
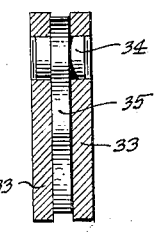
Fig. 6 is a detail sectional view of the same taken on the line VI—VI of Fig. 4.

Diametrically opposite the floating ends of the brake shoes 14 is an actuating mechanism for the brake shoes. The closure plate 9 is provided with a series of studs 31 and attached thereto by nut equipped bolts 32 or other fastening means is a housing 33 consisting of parallel spaced apart plates. Pivotally mounted in the housing 33 by transverse pins 34, are curved levers 35 engaging wear members 36 mounted on the ends of the shoes 14, as best shown in Figs. 4 and 5. These wear members extend between the plates of the housing 33 and prevent lateral shifting of the ends of the brake shoes.

The closure plate 9 has a bearing 37 provided with a bushing 38 for a rock shaft 39. The outer end of this rock shaft may have a crank 40 so that it may be conveniently rocked from some remote point. On the inner end of the rock shaft 39 is a cam or actuator 41 normally engaged by the ends of the levers 35 and these levers are so held by the wear members 36 of the brake shoes 14, which are connected by a coiled retractile spring 42, best shown in Fig. 4. The actuator 41 is operatable between the plates of the housing 33 and with the bearing 37 abutting the housing and said housing connected to the closure plate 9, it is practically impossible for this part of my mechanism to be accidentally displaced.

When the actuator 41 is rocked the outer ends of the levers 35 are shifted outwardly and there is a double leverage movement which is translated to the ends of the brake shoes 14 and said shoes brought into engagement with the drum 6, for their entire length, to retard rotation of said drum and the vehicle wheel. A maximum area of the linings 15 of the brake shoes 14 is brought into engagement with the lining 8 of the drum 6 and as these elements wear the cam 21 may be adjusted to reposition the floating ends of the brake shoes, whereby actuation of the opposite ends of the brake shoes will ensure uniform engagement of said brake shoes with the brake drum. There is a self centralizing of the brake shoes which relieves the cam or actuator shaft of excessive stresses or strains, and it is by virtue of the interposed levers that the action of the cam is multiplied or increased to the extent of reducing the power ordinarily required for the operation of the brake mechanism.

Further as to the operation of the device, it will be seen that the intermediate levers 35, although swinging on pivot points located one above and one below the end 36 of the corresponding brake shoes, engage these ends at similar points. The result is uniform movement of these ends which would not occur if the actuator 41 came directly into engagement with the ends rather than acting through the medium of the levers 35.

The slot-and-pin connection between each shoe and the closure plate 9 allows the adjustable ends of the shoes to have a floating relation to the member 9 rather than a strict pivotal movement as would occur if the links 11 were simply pivotally attached to the plate 9. As a result of this means of connection, the ends 13 of the brake shoes 14 are allowed a certain amount of play, sufficient to permit the operative surfaces of the shoes to come into superficial engagement with the inner wall of the brake drum. When the shoes initially come into engagement with the drum, the rotation of the latter tends to draw the shoes into full superficial contact, and this tendency is permitted to take effect because of the floating attachment of the ends 13 to the plate 9.

It is thought that the operation and utility of the brake mechanism will be apparent without further description, and while in the drawings there are illustrated a preferred embodiment of my invention, it is to be understood that the structural elements are susceptible to such variations and modifications as fall within the scope of the appended claims.

What I claim is:—

1. In a brake mechanism, a brake drum, opposed drum engaging brake shoes, pivotal members supporting normally fixed ends of said shoes, an adjustable cam between said pivotal members, pivotal levers engaging the other ends of said shoes, an actuator between said pivotal levers adapted for swinging said pivotal levers to place said shoes in engagement with said drum, and a ratchet mechanism for holding said cam in adjusted positions.

2. In a brake mechanism, a brake drum, brake shoes in said drum adapted to be actuated to engage said drum, pivoted members supporting ends of said brake shoes, an adjustable cam between and engaging said pivoted members, and means for holding said cam in an adjusted position, said means including a ratchet wheel fixedly held relative to said cam, and a multi-toothed pawl for engaging said wheel.

3. In a brake mechanism, a brake drum, a fixed plate, opposed drum engaging brake shoes adapted for engagement with the brake drum, mechanism between ends of said shoes for applying said shoes to the drum, and a pair of links having a slot-and-pin connection to said plate, said links being pivotally connected to the remaining ends of said shoes.

4. In a brake mechanism, a brake drum, a fixed plate, opposed drum engaging brake shoes adapted for engagement with the brake drum, mechanism between ends of said shoes for applying said shoes to the drum, a pair of links having a slot-and-pin connection to said plate, said links being pivotally connected to the remaining ends of said shoes, and an adjustable cam engaging said links.

5. In a brake mechanism, a brake drum, a plate, opposed drum engaging brake shoes each having one end pivoted to said plate, levers pivoted to the plate and slidably engaging the remaining ends of said shoes at intermediate points on said levers, and an actuator between said levers and engaging the free ends thereof.

6. In a brake mechanism, a brake drum, a plate, opposed drum engaging brake shoes, links pivoted to one end of said shoes and having a floating connection to said plate, and means for setting said links in adjusted positions.

7. In a brake mechanism, a brake drum, a fixed plate, opposed drum engaging brake shoes adapted for engagement with the brake drum, mechanism between ends of said shoes for applying said shoes to the drum, spacing members each having one end pivotally connected to one of said shoes and the remaining end having a floating pivotal connection with said plate, and an adjusting member between and engaging said spacing members.

In testimony whereof I affix my signature.

CLAUDE SAUZEDDE.